United States Patent Office 3,497,448
Patented Feb. 24, 1970

3,497,448
PRETREATMENT OF HYDROFORMING
FEED STOCK
Glen Porter Hamner, Baton Rouge, and Ralph Burgess Mason, Donham Springs, La., assignors to Esso Research and Engineering Company, a corporation of Delaware
No Drawing. Filed May 12, 1967, Ser. No. 637,911
Int. Cl. C10g 37/10, 25/04, 23/04
U.S. Cl. 208—60
14 Claims

ABSTRACT OF THE DISCLOSURE

Hydroformer feed stock, e.g. virgin naphtha, is pretreated with a crystalline alumino-silicate zeolite having uniform pore openings less than about 6 A. units and combined with a metallic hydrogenation component, in the presence of added hydrogen and at elevated temperature and pressure, in order to simultaneously convert low octane-producing paraffins and to desulfurize the feed. The selectively treated feed is then hydroformed in conventional manner. Preferred pretreatment catalyst comprises a 5 A. zeolite containing a Group II–B metal and a metallic hydrogenation component such as a Group VIII metal, e.g. palladium.

BACKGROUND OF THE INVENTION

Field of the invention

This invention relates to an improved combination process involving pretreatment of typical hydroformer feed stock such as a virgin naphtha, followed by conventional hydroforming. More particularly, it relates to a process involving pretreating a naphtha feed stock with a relatively small pore crystalline alumino-silicate zeolite catalyst in the presence of hydrogen to simultaneously desulfurize said feed stock and convert the low octane-producing paraffinic content thereof to materials of higher octane rating, or to lower boiling materials which are readily removable from said feed stock, followed by conventional hydroforming of the upgraded feed.

Description of the prior art

Hydroforming is a well-known, widely used process for upgrading hydrocarbon fractions boiling in the motor gasoline or naphtha boiling range to increase their octane number and to improve their burning or engine cleanliness characteristics. For example, hydroforming is used to convert broad range naphtha cuts into motor fuels of greatly improved anti-knock and volatility characteristics. By "hydroforming" is meant a process wherein hydrocarbon fractions boiling in the motor fuel or naphtha range are treated at elevated temperatures and pressures in the presence of certain solid catalysts and hydrogen, or hydrogen-rich process or recycle gas, for periods sufficient to effect the desired improvement in the feed. The feed is usually increased in aromaticity, ordinarily with no net consumption of hydrogen and often a net production of hydrogen. The hydroforming operations are usually carried out at temperatures in the range of 750° to 1150° F. and pressures of 50 to 1000 p.s.i.g. with such catalysts as the oxides or sulfides of metals of Groups IV, V, VI, VII and VIII of the Periodic System of elements, either alone or preferably supported on a suitable, relatively large pore size base, such as alumina gel, precipitated alumina, zinc-alumina spinel, chromia-alumina, silica alumina, etc. By "relatively large pore size" is meant a pore size greater than about 6 A.

More particularly, typical hydroforming catalysts will include the oxides of Group VI metals such as molybdenum or chromium, or a metal of the palladium series such as platinum, palladium, osmium, irridium, ruthenium, or rhodium, deposited on a suitable support such as silica-alumina, or components thereof. These catalysts may contain varying amounts of halogen, boria or other components designed to enhance their activity or selectivity. A preferred catalyst will be platinum (e.g. 0.2 to 2.0 wt. percent) on an alumina containing a minor amount (e.g. 0.1 to 0.5 wt. percent) of a chloride or fluoride. The hydroforming process per se may be carried out in a fixed bed, moving bed or fluidized bed system.

Conventional hydroforming operations for the octane improvement of naphtha feed stocks are restricted in terms of potential octane improvement because of the sulfur content of the feed and the presence of paraffins. In view of the sensitivity of conventional hydroforming catalysts to sulfur or sulfur compounds in the feed, it has ordinarily been necessary to pretreat the feed as by hydrofining to reduce its sulfur content, e.g. to about below 40 parts per million. This has been accomplished by subjecting the feed stock to hydrofining or pretreatment with hydrogen in the presence of a hydrodesulfurizing catalyst to convert sulfur compounds to hydrogen sulfide which is then stripped from the naphtha feed stock before charging same to the hydroforming reactor. However, while the sulfur content problems may be solved by hydrofining, the substantial normal paraffinic content remaining in the hydroformed product proves to be an octane debit. This is particularly true with respect to the high boiling fractions of the naphtha-like feed. In order to successfully hydroform the higher boiling fractions which usually contain an undesirable high normal paraffinic content, the need arises for high severity conditions in the hydroforming reactor with a concurrent increased carbon make tending to more rapid deactivation of the hydroforming catalyst.

By means of the present invention the hydroformer feed stock is treated with a specific type of catalyst which is capable of both desulfurizing the feed and converting the normal paraffinic low octane hydrocarbons to either higher octane-producing material, e.g. branched-chain hydrocarbons, or to lower-boiling, easily removable materials. It is, therefore, the general purpose of the present invention to povide an improved combination process involving initial pretreatment to remove or convert undesirable normal paraffinic constituents in the feed prior to a conventional hydroforming operation. Through the use of the present process, substantially higher overall octane products result, due to selective conversion of the undesirable components in the feed and simultaneous desulfurization which leaves the naphthenic and aromatic portions of the feed essentially unchanged. Thus, the octane number of the naphtha fractions is improved and certain of the difficulties associated with hydroforming are avoided by selective conversion of the feed to remove paraffins and sulfur prior to conventional hydroforming of the thus-treated feed stock. In the hydroforming zone, less carbon formation is encountered.

SUMMARY OF THE INVENTION

Pretreatment step

The pretreatment step of the process of the invention is accomplished by contacting a naphtha feed stock, in the presence of gaseous hydrogen, with a relatively small pore size catalyst which can be characterized as a crystalline alumino-silicate zeolite. By "relatively small pore size" is meant a pore size of below about 6 A. units, particularly 4 to 6 A., e.g. about 5 A. More particularly, the catalyst employed will have pores capable of affording entry to the objectionable normal paraffinic hydrocarbons but incapable of admitting the more valuable branched and cyclic hydrocarbons. For convenience, these materials may hereinafter be referred to generally as "5 A. zeolites." The result of such treatment is to selectively convert the normal paraffinic components either to lower-boiling saturated products which can then be readily removed, thereby leaving a naphtha product of highly improved quality, or to desirable branched-chain paraffins and/or olefins which tend to be high octane-producing components.

Crystalline metallo alumino-silicate zeolites having uniform pore openings of less than about 6 A. contemplated for use in this invention are well known and available in either synthetic or natural form. For example, a suitable starting material, referred to as "Zeolite A" in U.S. Patent No. 2,882,243, has a molar formula (dehydrated form) of $$1.0 \pm 0.2 M_{2/n}O : Al_2O_3 : 1.85 \pm 0.5 SiO_2$$

where M is a metal (usually sodium) and $n$ is its valence. It may be prepared by heating a mixture containing $Na_2O$, $Al_2O_3$, $SiO_2$ and $H_2O$ (supplied by suitable source materials) at a temperature of about 100° C. for 15 minutes to 90 hours or longer. Suitable ratios of these reactants are fully described in the aforementioned patent.

One suitable process for preparing such materials synthetically involves, for example, the mixing of sodium silicate, preferably sodium metasilicate, with sodium aluminate under carefully controlled conditions. The sodium silicate employed should have a ratio of soda to silica between about 0.8 to 1 and about 2 to 1; and the sodium aluminate may have a ratio of soda to alumina in the range of from about 1 to 1 to about 3 to 1. The amounts of the sodium silicate and sodium aluminate solutions employed should be such that the ratio of silica to alumina in the final mixture ranges from about 0.8 to 1 to about 3 to 1 and preferably from about 1 to 1 to about 2 to 1. Preferably, the aluminate is added to the silicate at ambient temperature with sufficient agitation to produce a homogeneous mixture. The mixture is then heated to a temperature of from about 180° to about 215° F. and held at that temperature for a period of from about 0.5 to about 3 hours or longer. The crystals may be formed at lower temperatures but longer reaction peiods will be required. At temperatures above about 250° F. a crystalline composition having the requisite uniform size pore openings is not obtained. During the crystallization step the pH of the solution should be maintained on the alkaline side at about 12 or higher. At lower pH levels crystals having the desired properties are not as readily formed.

The products produced by the above procedure will have uniform pore openings of about 4 A. as produced in the sodium form. They may then be converted to products having uniform pore openings of about 5 A. by replacement of the sodium via conventional ion exchange techniques with various metal cations.

Various other crystalline zeolites having uniformly dimensioned pores and effective pore diameters of about 5 A. are also herein contemplated and will include such natural materials as erionite, chabazite, analcite, mordenite and the like, and their synthetic counterparts. Thus, both the natural and synthetic varieties of relatively small pore size zeolites are contemplated with the only limitation being one of pore size. As indicated, the pore size must be sufficient to substantially admit the straight-chain hydrocarbons but insufficient to admit the valuable high octane-producing components, such as the aromatics, so as to avoid their conversion. This capacity should, therefore, be demonstrated at the particular conditions contemplated, since the effective pore diameter of these zeolite materials often varies with temperature and pressure.

In accordance with the invention, it has been found that certain metallic cations are to be preferred in the zeolite catalyst. More particularly, it has been found that cations of metals in Group II-B of the Periodic Table (Handbook of Chemistry and Physics, 38th Edition, Chemical Rubber Publishing Co.) are peculiarly suited to the purposes of the present invention. These will include cadmium and zinc cations, with zinc cation being particularly preferred. Thus, the catalyst used in the pretreatment step of the present invention is prepared from a crystalline alumino-silicate zeolite which, preferably after zinc cation exchange, has uniform effective pore openings of less than 6 A., preferably 4 to 6 A., most preferably about 5 A. in diameter. The most preferred cation solution will be an aqueous solution of a zinc salt, such as zinc chloride, zinc acetate, etc. The extent of the ion exchange should be sufficient to reduce the alkali metal, e.g. sodium content of the zeolite, to less than 10 wt. percent, and preferably less than 5 wt. percent. The ion exchange is preferably conducted to cause at least 25%, and more preferably greater than 50%, of the exchangeable cation content to be divalent by replacement with the preferred zinc cation. It will be understood that although the most preferred catalysts will be prepared by using zinc cation as the sole exchanging cation, the presence of zinc together with other exchanging cations, such as hydrogen cation, will also be highly useful. Thus, the present invention contemplates the use of a 5 A. zeolite containing zinc or cadmium cation. Preferably, the zeolite will have a major portion of its cation content supplied by zinc (or cadmium) with perhaps minor portions of residual sodium as well as minor portions of other ions which may also have been introduced via ion exchange for various purposes.

As a further step in the preparation of the pretreatment catalyst, the catalyst is preferably combined with an active metallic hydrogenation component which may be chosen from Groups V-B, VI-B, VII-B or VIII of the Periodic Table and which is suitably exemplified by the metals cobalt, nickel, tungsten, platinum, palladium, etc. The hydrogenation component may be in the form of the free metal as in the case of platinum group metals, or as the oxide or sulfide as in the case of cobalt, etc., or as mixtures of such metals, oxides or sulfides. Platinum group metals (i.e., metals of the platinum and palladium series) will be preferred for purposes of the present invention, with palladium being particularly preferred. Incorporation of the hydrogenation component may be accomplished by any conventional technique, such as ion exchange followed by reduction, impregnation, etc. When palladium is employed, the zinc-exchanged alumino-silicate is preferably exchanged with an ammoniacal solution of palladium chloride sufficient to produce the desired amount of hydrogenation metal in the final product, and then dried and calcined at a temperature of 800° to 1,000° F. Reduction of the metal is then accomplished either separately or in the hydrocracking reaction per se. The amount of hydrogenation component may range from about 0.1 to about 25 wt. percent based on the weight of final product. In the case of platinum group metals, e.g. palladium, the preferred amount will be in the range of about 0.1 to 6, e.g. 0.5 to 3 wt. percent based on dry catalyst.

As an additional preferred embodiment, it has been found that the activity and effectiveness of the pretreatment catalysts used herein may be substantially improved by contact with sulfur prior to their use. The catalyst is preferably sulfactivated to enhance its activity by contact with either a sulfur-containing feed or, if the feed has a low sulfur content, with hydrogen sulfide or an added sulfur compound wihch is readily convertible to hydrogen sulfide at the conditions employed, e.g. carbon disulfide and the like. The extent of this sulfactivation treatment should be sufficient to incorporate about 0.5 to 15 wt. percent sulfur into the pretreatment catalyst.

The operating conditions utilized in the initial pretreatment stage using the relatively small pore size zeolite catalyst will include a temperature of about 600° to about 1,000° F., preferably about 700° to about 950° F., most preferably about 750° to about 900° F.; a pressure of about 50 to about 1,500 p.s.i.g., preferably about 200 to about 1,000, most preferably about 400 to about 800 p.s.i.g.; a liquid hourly space velocity of about 0.1 v./v./hr. to about 10 v./v./hr., preferably about 0.2 v./v./hr. to about 5 v./v./hr., and most preferably about 0.3 v./v./hr. to about 2 v./v./hr.

It is essential that hydrogen be present in the pretreatment zone at the aforesaid conditions. The hydrogen will preferably be introduced at a rate within about 1,000 to about 20,000 standard cubic feet per barrel of feed, more preferably about 1,500 to about 10,000, and most preferably about 2,000 to about 5,000 s.c.f./bbl. The initial pretreatment stage which involves both the selective conversion of normal paraffins and the desulfurization of the feed will usually consume a substantial amount of hydrogen, which hydrogen can be supplied from a fresh source or recycle hydrogen or hydrogen produced in the subsequently-occurring hydroforming reaction. Generally, the consumption of hydrogen in the pretreatment stage will be in the range of about 25 s.c.f./bbl. of feed to about 2,000 s.c.f./bbl. of feed, typically 50 s.c.f./bbl. of feed to 1,500 s.c.f./bbl. of feed, e.g. 100 s.c.f./bbl. of feed to 500 s.c.f./bbl. of feed. Under certain conditions, however, e.g. with highly naphthenic feeds and relatively small amounts of normal paraffins, e.g. ~5%, it may be possible to conduct the operation with no net hydrogen consumption; that is to say, the hydrogen requirement will be met by partial dehydrogenation of the naphthenic components.

Hydroforming step

The effluent from the pretreatment zone is preferably passed to a fractionating column wherein $C_5$ and lighter components are removed and the $C_6+$ components are passed to the conventional hydroforming stage. This stage will operate at essentially the same pressure conditions as the pretreatment zone so that the stages can be operable in tandem utilizing the same recycle gas circuit. As mentioned previously, hydrogen produced in the hydroforming zone can be utilized as the source of hydrogen for the initial pretreatment step.

The hydroforming step will generally utilize the catalysts and conditions conventionally employed in the art as hereinbefore described. For fixed bed operations, which will be preferred, molybdena-alumina, platinum-alumina, etc. catalysts will be employed. Feed rates of 0.2 to 10 v./v./hr., preperably 0.5 to 5 v./v./hr., e.g. 1 to 3 v./v./hr., will be suitable at temperatures of about 750° to 1150° F., e.g. 850° to 950° F., and recycle hydrogen rates of 2000 to 10,000 s.c.f/bbl., e.g. 3000 to 6000 s.c.f./bbl.

The hydroformer is operated to best advantage with $C_6$–430° F. naphtha feeds and for this reason the $C_5$ portion is removed in the fractionator. Of this overhead, the $C_4$ and $C_5$ portions are segregated for high octane front end fill portions of the naphtha pool.

The above conditions are to be regarded as representative only. Conventional hydroforming operations are described, for example, in the following U.S. patents: 2,895,905; 3,002,921; 3,134,732 and 2,937,137. As will be brought out below, use of the pretreatment step of the invention allows for significantly reduced severity levels for equivalent product yield and quality.

As previously mentioned, the pretreatment of the hydroformer feed leaves the naphthenic and aromatic portions of the feed essentially unchanged. Fractionation of the effluent from the zeolite catalyst zone provides the desired hydroformer feed of appropriate initial boiling point and the remaining product, substantially freed of sulfur, nitrogen and normal paraffins, is then passed to the conventional hydroforming zone for essentially complete conversion of naphthenes to aromatics.

The marked improvement in hydroforming the pretreated naphtha feed in accordance with the invention allows for the use of low severity conditions to achieve results usually obtained under conditions of high severity in conventional hydroforming operations. Thus, with the pretreated $C_{6+}$ feed, the hydroformer may be operated for a given octane number product at milder conditions than ordinarily possible without the pretreatment step. This causes less coke make and provides for a longer active life of the hydroformer catalyst. In accordance with the invention, the hydroforming temperature may thus be lowered some 20° to 40° F. and the feed rates may be increased aproximately 50%, without sacrifice in product yield or octane.

The hydrocarbon feed stocks which are hydroformed in accordance with the present process will include mixtures of hydrocarbons and particularly petroleum distillate boiling within the approximate range of 60° to about 450° F., which range will include naphthas, gasolines and kerosenes. Although the gasoline fraction may be a full boiling range gasoline, it will preferably be a naphtha having an initial boiling point between about 100° and about 250° F. and a final boiling point between about 350° and about 450° F. Typical feed stocks will include virgin naphthas boiling in the range of 1000° to 450° F., e.g. 150° to 430° F; heavy naphthas boiling in the range of 200° to 450° F., e.g. 250° to 430° F., and light naphthas boiling, for example, in the range of 100° to 300° F. It will be appreciated that the above charge stocks, catalysts, and conditions will, to the extent possible, fall within the ranges conventionally employed in hydroforming operations.

It will be understood that the present process can be conducted in a multiplicity of stages or in a two-stage operation. In any event, however, the initial pretreatment stage will contain the crystalline zeolite catalyst which serves to convert the straight-chain hydrocarbons to more valuable components, or removable components, thereby causing substantial upgrading of the hydroformer feed. Subsequent to the pretreatment stage, a number of conventional hydroforming stages can be employed. The hydroformate produced may be blended with the high octane $C_4$ and $C_5$ products from the pretreatment zone as separated in the fractionating column so as to obtain a maximum yield of octane products. Various other alternatives will occur to those skilled in the art. For example, the hydroformate itself can be separated by fractionation with subsequent recovery of blending of the higher octane fractions for particular uses or purposes. The aforementioned combination of $C_4$ and $C_5$ products from the pretreatment zone with the hydroformate product will result in a greater yield-octane relationship derived through the use of the present invention.

The invention will be further understood by reference to the following examples which are given for illustrative purposes.

DESCRIPTION OF THE PREFERRED EMBODIMENTS

Example 1

A hydroforming operation in accordance with the present invention was carried out with a typical feed stock which was a 200° to 350° F. boiling range virgin naphtha fraction derived from a South Louisiana crude. This feed was pretreated with a crystalline alumina-silicate zeolite having uniform pore openings of about 5 A. units, and containing a hydrogenation metal. Specifically, the catalyst was prepared as follows: A charge of 500 grams of commercial sodium "Zeolite A" (supplied by the Linde Division of Union Carbide Corporation) having pore openings of about 4 A. was suspended in 2000/ cc. of water, and a solution containing about one pound of zinc chloride in 500 grams of water was added slowly with good stirring at ambient temperature. Agitation was continued at ambient temperature for about four hours, whereupon the suspension was allowed to settle and the supernatant mother liquor was removed by decantation. The solids were water washed three times each with about 2000 cc. of water followed by removal of the water by decantation and filtration. This procedure was performed on the wet solids two more times so that the total number of zinc ion exchanges was three. After the third exchange, the product was water washed by reslurrying in about 2000 cc. of water followed by removal of the wash liquid by filtration. After two more washes, the product was dried. The dried product was suspended in about 500 cc. of water to which 375 grams of a palladous ammonium chloride solution containing .0132 gram of palladium per cc. was added with good stirring. After a period of about one hour the solution was removed by filtration and the residue was dried for pilling and use. The catalyst contained 0.89% palladium, 0.8 wt. percent sodium, 20.8 wt. percent zinc, 38.1 wt. percent $SiO_2$ and 30.8 wt. percent $Al_2O_3$. It had uniform pore openings of about 5 A.

The catalyst was dried and pelleted and charged to a small fixed bed pilot plant reactor where it was sulfactivated by contact with a $C_5$–$C_6$ naphtha stream containing 1% carbon disulfide over a 20 hour period at 700° F., 500 p.s.i.g., 4 v./v./hr. and 2000 s.c.f. $H_2$/bbl. gas rate. The catalyst was then heated at atmospheric pressure in a stream of hydrogen to a temperature of 850° F. Thereupon, the pressure was brought to 500 p.s.i.g. and the virgin naphtha feed (representing a conventional hydroformer feed) was passed downwardly together with hydrogen over the catalyst at 850° F. and 500 p.s.i.g., with a feed rate of 0.5 v./v./hr. and a hydrogen gas rate of about 2500 s.c.f./bbl. This operation was effective for removing essentially all of the sulfur impurities and a substantial portion of the paraffinic hydrocarbons, thus rendering it more valuable as a hydroformer feed. The distribution and inspections of the naphtha feed and liquid product resulting from contact with the zeolite catalyst are shown in the following table, together with pertinent octane data.

TABLE I.—PRETREATMENT OF HYDROFORMER FEED WITH 5 A. ZEOLITE CATALYST

| | Feed | Product |
|---|---|---|
| Wt. percent $C_5$+ | 100 | 88 |
| Sulfur, p.p.m | 89 | 1 |
| Wt. percent aromatics | 17.2 | 20.3 |
| Wt. percent naphthenes | 39.9 | 45.8 |
| Wt. percent paraffins | 42.9 | 33.9 |
| Octane data: | | |
| Research clear | 53.6 | 70.0 |
| Research +3 cc. TEL | 77.4 | 88.0 |
| Motor clear | 52.0 | 68.6 |
| Motor +3 cc. TEL | 73.7 | 84.4 |

It will be observed that a substantial improvement in the quality of the feed for subsequent hydroforming resulted from the pretreatment with 5 A. zeolite catalyst. Sulfur was essentially removed, and octane was improved due to removal of paraffins and formation of aromatics and naphthenes.

Example 2

A virgin naphtha feed, derived from a South Louisiana crude and having the inspection set forth below, was treated with the zinc palladium 5 A. zeolite catalyst of Example 1 at 850° F., 0.5 v./v./hr., 500 p.s.i.g. and 2500 s.c.f./bbl. feed. The operation was conducted in a fixed bed pilot plant unit of 200 cc. size. Inspections of the feed and the effluent product from the first stage zeolite zone are shown in the following table.

| | Virgin naphtha feed | |
|---|---|---|
| Inspections | Before pretreatment | After pretreatment |
| Gravity, °API | 54.4 | 52.8 |
| Distillation, D-86: | | |
| IBP | 220 | 175 |
| 5 | 230 | 195 |
| 10 | 234 | 205 |
| 50 | 254 | 250 |
| 90 | 294 | 304 |
| 95 | 308 | 325 |
| FBP | 326 | 330 |
| Recovery, ml | 98 | 98 |
| Residue, ml | 1 | 1 |
| Normal Paraffins | 16.9 | 3.1 |

The effluent from the zeolite catalyst contacting zone was fractionated to remove the lower boiling portions and the 175° F.+ fraction was then introduced into a pilot plant scale hydroforming reactor of 200 cc. size at 910° F., 1.7 v./v./hr., 375 p.s.i.g. and 5000 s.c.f. $H_2$/bbl. of feed. The catalyst used in the hydroforming stage comprised a commercially available platinum-alumina reforming catalyst containing 0.5 wt. percent platinum and a small amount of chlorine (less than 0.5%). Data on this operation are shown in the following table together with comparative data on the virgin naphtha feed per se; i.e. without pretreatment.

TABLE II.—HYDROFORMING OF VIRGIN NAPHTHA FEED PRETREATED WITH 5 A. ZEOLITE CATALYST
[910° F., 1.7 v./v./hr., 375 p.s.i.g., 5,000 s.c.f. $H_2$/bbl. feed]

| Feed | Virgin naphtha | ZnPd 5 A. treated virgin naphtha (175° F.+) |
|---|---|---|
| Liquid product, wt. percent | 92 | 91 |
| Liquid product inspections: | | |
| Gravity, °API at 60° F | 49 | 44.6 |
| Octane data: | | |
| RON clear | 89.5 | 95.1 |
| RON +3 cc. TEL | 97.5 | 100.1 |
| MON clear | 78.6 | 86.4 |
| MON +3 cc. TEL | 89.8 | 92.7 |
| Distillation, D-86: | | |
| IBP | 119 | 123 |
| 5 | 185 | 189 |
| 10 | 208 | 213 |
| 50 | 254 | 256 |
| 90 | 308 | 307 |
| 95 | 328 | 330 |
| FBP | 352 | 357 |
| Recovery, ml | 98 | 98 |
| Residue, ml | 1 | 1 |
| Product distribution, wt. percent on output basis: | | |
| $H_2$ | 1.2 | 2.4 |
| $C_1$ | 0.4 | 0.4 |
| $C_2$ | 1.0 | 0.7 |
| $C_3$ | 2.3 | 1.9 |
| $C_4$ | 3.1 | 2.7 |
| $C_5$+ | 91.9 | 92.0 |
| Product inspections: | | |
| Paraffins, wt. percent | 38 | 28 |
| Normal paraffins | 14 | 7 |
| Aromatics, wt. percent | 50 | 57 |
| Toluene | 10 | 12 |
| Xylenes | 13 | 16 |
| Naphthenes, wt. percent | 12 | 15 |

As shown in the above Table II, a substantial improvement in octane number results from the combined 5 A. zeolite catalyst pretreatment and conventional hydroforming. Of special significance is the improvement in motor octane number of the product from the two stage operation. Not only is it substantially higher than the product from the single stage hydroforming, but is some two octane numbers higher than can be predicted from the research octane number and typical hydroformer correlations. This is attributed to the change in hydroforming response resulting from removal of the normal paraffins and sulfur and nitrogen contaminants. As indicated by the product inspection data, the process of the invention produces higher aromatic and naphthenic contents and lower normal paraffinic content.

Example 3

A light virgin naphtha feed having a boiling range of 100° to 271° F. was fractionated into a low boiling fraction boiling below 160° F. and a high boiling fraction boiling above 160° F. The 160° F.+ fraction (98.5% of said fraction boiling overhead at 160° to 271° F.) was introduced into a 200 cc. laboratory unit in downflow operation containing a conventional commercially-available hydroforming catalyst which was comprised of a 0.5% platinum on alumina base containing less than 0.5% chlorine.

For comparison and to further illustrate the present invention, the unfractionated light virgin naphtha feed was first treated with a catalyst of the type used in the present invention, at 850° F., 500 p.s.i.g., 2.0 v./v./hr., and an exit hydrogen rate of 2,000 s.c.f./bbl. of feed in a 200 cc. fixed bed laboratory unit in a downflow operation. The liquid effluent from this catalyst bed was similarly fractionated into a 160° F.— and a 160° F.+ fraction. As in the first case above, the 160° F.+ portion was hydroformed over the conventional platinum-alumina hydroforming catalyst at the operating conditions shown in the following Table III. Octane ratings were obtained on both the $C_5+$ product and on a blend of the latter with the 160° F.— fraction.

The catalyst used for the pretreatment step of the invention was prepared from the mineral erionte which is a naturally-occurring zeolite having elliptical pore openings of 4.7 to 5.2 A. on its major axis. Specifically, a sample of erionite was suspended in water and exchanged with zinc chloride solution in a manner similar to the procedure used in Example 1. The zinc-containing erionite product was then combined with palladium essentially following the procedure of Example 1, and the final catalyst analyzed 7.7 wt. percent zinc, 0.67 wt. percent sodium, 63 wt. percent silica, 14.7 wt. percent alumina, 0.61 wt. percent palladium and 2.72 wt. percent potassium. The product was pelletized for use in a fixed bed test unit and was sulfactivated by contact with a $C_5$–$C_6$ naphtha stream containing 1% carbon disulfide over a 20 hour period at 700° F., 500 p.s.i.g., 4 v.v/hr. and 2,000 s.c.f. $H_2$/bbl. gas rate.

The comparison between the two operations described above is shown in the following table.

TABLE III.—NAPHTHA HYDROFORMING

[Hydroforming Conditions: 400 p.s.i.g., 5,000 s.c.f./bbl. $H_2$ rate, 2 v./v./hr.]

| Charge to operation | 160° F.+ fraction (no pretreat) | 160° F.+ fraction (pretreated* with Pd-Zn-Erionite) |
|---|---|---|
| Operating temp., ° F | 900 | 890 |
| Yield, wt. percent of charge | 85.3 | 88.0 |
| Octane number data, $C_5+$ prod.: | | |
| RON clear* | 88.2 | 94.0 |
| RON +3 cc. TEL | 97.0 | |
| MON clear | 80.6 | 83.6 |
| MON +3 cc. TEL | | |
| Octane number data, composite $C_5+$ prod. and IBP-160° F. portion: | | |
| RON clear | 76.1 | 85.7 |
| RON +3 cc. TEL | 92.8 | 99.0 |
| MON clear | 76.8 | 86.5 |
| MON +3 cc. TEL | 89.5 | 96.5 |

*Pretreat conditions: 500 p.s.i.g., 850° F., 2.0 v./v./hr. 2,000 s.c.f. $H_2$/bbl.

As shown above, a decided advantage in octane number is demonstrated for the combination process involving pretreat with the palladium-zinc erionite catalyst followed by hydroforming in accordance with the invention. The demonstrated advantages are observed on either the hydroformate product alone ($C_5+$ product) or on the hydroformate plus the 160° F.— portion which bypassed the hydroforming reactor. It is further seen that the hydroforming reaction which followed the pretreat in accordance with the invention could be accomplished at a somewhat lower temperature which is an added economic asset, in that hydroformer catalyst performance may be prolonged. This example further illustrates the embodiment of the invention wherein a naphtha feed stock can be pretreated to remove or convert low octane-producing normal paraffins, followed by separation of the pretreated naphtha feed as by fractionation into a high-boiling and low-boiling fraction (the low-boiling fraction normally not being amenable to octane improvement by conventional hydroforming), hydroforming of the high-boiling fraction and blending of the two resulting fractions to achieve an overall improvement in the octane number of the resultant naphtha product. Other alternatives will also be evident to those skilled in the art. For example, the feed stock may first be fractionated into the high-boiling and low-boiling fractions and either or both fractions pretreated in accordance with the invention, followed by hydroforming and subsequent blending.

What is claimed is:

1. In a hydroforming operation wherein naphtha containing hydrocarbons are subjected to contact with a hydroforming catalyst in the presence of hydrogen at elevated temperature and pressure to thereby increase their octane rating, the improvement which comprises pretreating a feed containing said hydrocarbons with a catalyst comprising a metallic hydrogenation component combined with a Group II–B-metal-containing crystalline aluminosilicate zeolite having uniform pore openings of less than about 6 A. at elevated temperature from 600° F. to 1000° and pressure between 50 to 1500 p.s.i.g. and in the presence of hydrogen.

2. The improvement of claim 1, wherein said metallic hydrogenation component contains a metal selected from the group consisting of metals in Groups V–B, VI–B, VII–B, VIII and mixtures thereof.

3. The improvement of claim 1, wherein said metallic hydrogenation component comprises a platinum group metal.

4. The improvement of claim 1, wherein said zeolite has been base exchanged with a Group II–B metal cation sufficient to substitute at least 25% of its cationic content with said cation.

5. The improvement of claim 1, wherein said zeolite catalyst has been sulfactivated by contact with a sulfur compound.

6. The improvement of claim 1, wherein said metallic hydrogenation catalyst comprises palladium.

7. The improvement of claim 1, wherein said Group II–B metal is zinc.

8. The improvement of claim 1, wherein said zeolite is of the Zeolite A type.

9. The improvement of claim 1, wherein said zeolite has a crystal structure similar to the mineral erionite.

10. An improved hydroforming process comprising the steps of (1) pretreating a naphtha feed stock by contacting said feed stock with a crystalline alumino-silicate zeolite having a pore size below about 6 angstrom units, said crystalline alumino-silicate zeolite having been base exchanged so as to reduce the alkali metal content to less than 10 weight percent with the further proviso that at least 25 percent of the exchanged alkali metal cations be replaced with a Group II–B metal cation, at a temperature between 600 and 1000° F. and a pressure between about 50 to 1500 p.s.i.g., and (2) thereafter, contacting the $C_6+$ components from the pretreatment step with a hydroforming catalyst at a temperature between 750 to 1150° F. in the presence of hydrogen, said hydrogen being present in an amount between 2000 to 10,000 s.c.f./bbl. $C_6+$ component feed.

11. The process of claim 10 wherein the pretreatment step is carried out at a temperature between 750 and 900° F. and the hydroforming step is completed at a temperature between 850 and 950° F.

12. The process of claim 10 wherein the said Group II–B metal is zinc.

13. The process of claim 10 wherein the pretreatment catalyst contains a metallic hydrogenation components selected from the group of metals consisting of Groups V–B, VI–B, VII–B, VIII and mixtures thereof.

14. The process of claim 13 wherein the hydrogenation component comprises a platinum group metal.

References Cited

UNITED STATES PATENTS

| 3,039,935 | 6/1962 | Eng | 208—26 |
| 3,122,494 | 2/1964 | Brown et al. | 208—63 |
| 3,331,767 | 7/1967 | Arey et al. | 208—111 |

DELBERT E. GANTZ, Primary Examiner

A. RIMENS, Assistant Examiner

U.S. Cl. X.R.

708—60, 139, 213